J. S. COPELAND.
DRIVING AND BRAKING MECHANISM FOR VEHICLES.
APPLICATION FILED APR. 29, 1898.
1,069,603.
Patented Aug. 5, 1913.
3 SHEETS—SHEET 1.
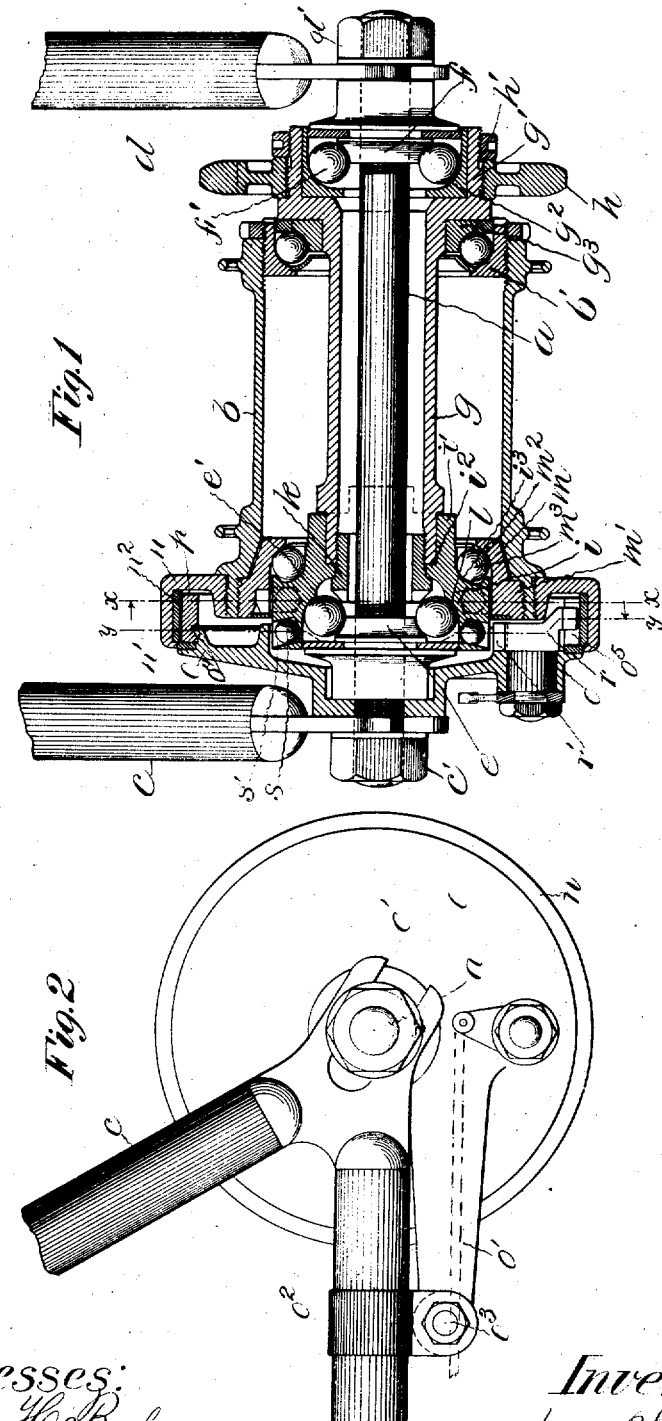
Witnesses:
William H. Barker
E. P. Coffin
Inventor:
James S. Copeland,
by Chas. L. Burdett
Attorney

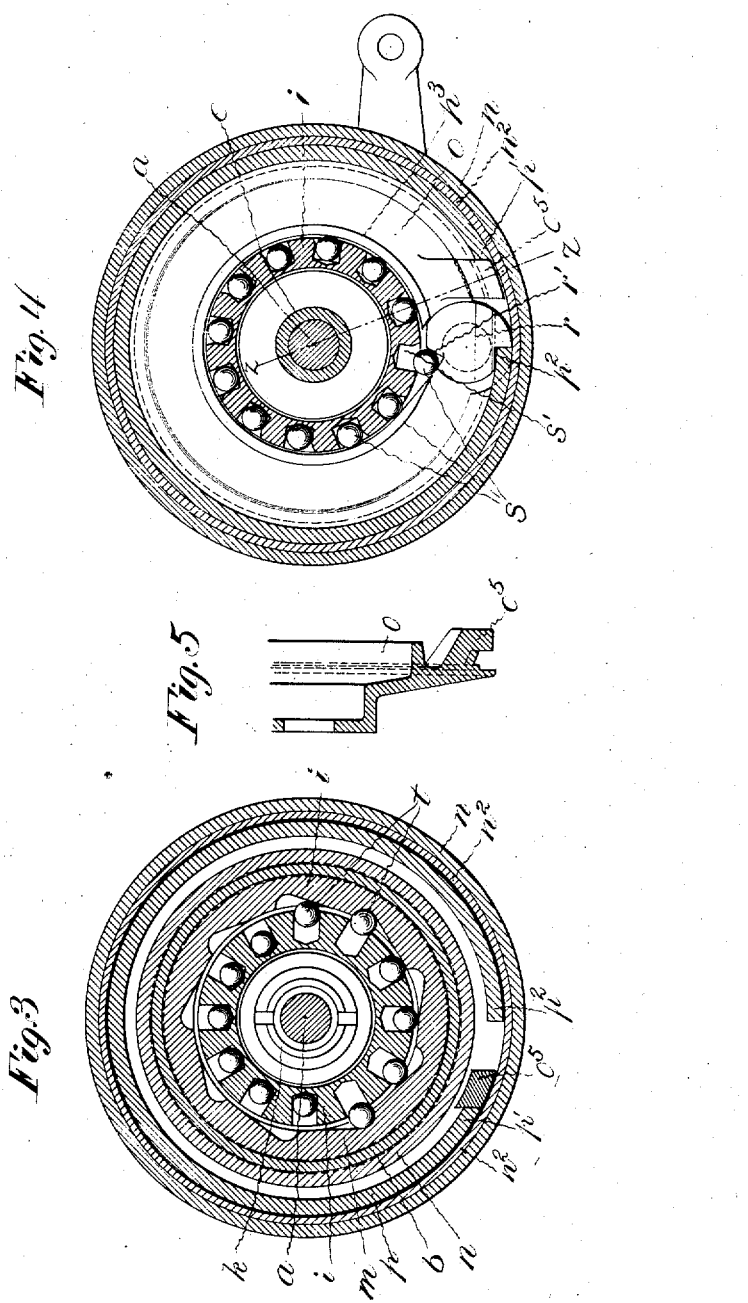

J. S. COPELAND.
DRIVING AND BRAKING MECHANISM FOR VEHICLES.
APPLICATION FILED APR. 29, 1898.
1,069,603.
Patented Aug. 5, 1913.
3 SHEETS—SHEET 3.
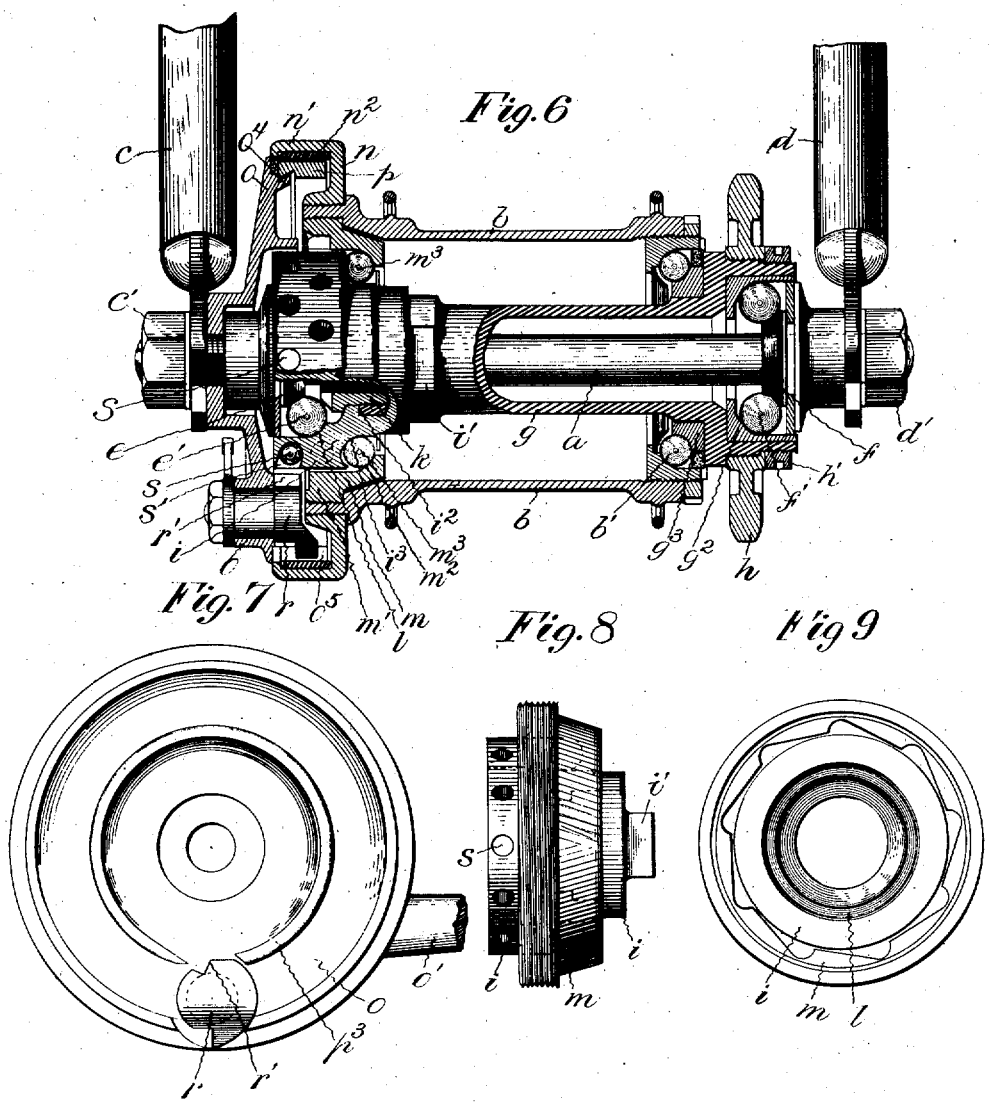
Witnesses:
William H. Barker
D. P. Coffin
Inventor:
James S. Copeland
By Chas. L. Burdett

UNITED STATES PATENT OFFICE.

JAMES S. COPELAND, OF HARTFORD, CONNECTICUT, ASSIGNOR, BY MESNE ASSIGNMENTS, TO THE NEW DEPARTURE MANUFACTURING COMPANY, OF BRISTOL, CONNECTICUT, A CORPORATION OF CONNECTICUT.

DRIVING AND BRAKING MECHANISM FOR VEHICLES.

1,069,603.  Specification of Letters Patent.  Patented Aug. 5, 1913.

Application filed April 29, 1898. Serial No. 679,185.

*To all whom it may concern:*

Be it known that I, JAMES S. COPELAND, a citizen of the United States, and resident of Hartford, in the county of Hartford and State of Connecticut, have invented certain new and useful Improvements in Driving and Braking Mechanisms for Vehicles, of which the following is a full, clear, and exact description whereby any one skilled in the art can make and use the same.

The object of my invention is to provide means, readily applicable to various forms of driving mechanism for velocipedes, bicycles and vehicles of that class, by the use of which the motive force employed in moving the vehicle may be so controlled as to drive it forward, to permit it to run free under its momentum, or to operate the devices as a brake to retard the forward movement of the vehicle.

To this end my invention consists in the device as a whole, in the combination of parts, and, further, in the details of parts and their combination as hereinafter described and more particularly pointed out in the claims.

Referring to the drawings: Figure 1 is a view in central section through the hub of the driving wheel of a bicycle showing connected frame parts. Fig. 2 is a detail view in side elevation of a rear fork and showing my invention. Fig. 3 is a view in transverse section through the driving mechanism on the line $x$—$x$ of Fig. 1, looking toward the right, and illustrating the clutch drive. Fig. 4 is a view in transverse section on the line $y$—$y$ of Fig. 1, looking toward the left, and illustrating the brake mechanism. Fig. 5 is a detail view through the edge of the brake drum on the line $z$—$z$ of Fig. 4, illustrating the location of the lock against which one end of the split ring thrusts. Fig. 6 is a view of the hub of the driving wheel and connected members with parts broken away to show construction. Fig. 7 is a view in elevation showing the inner surface of the brake disk. Fig. 8 is a detail view in elevation of the clutch drum showing a ball carrier within it. Fig. 9 is a view in elevation of the part shown in Fig. 8, looking into the clutch drum from the outside.

In the accompanying drawings the parts which directly relate to or are connected with the devices in which the invention resides are the only features fully illustrated, and in connection with a bicycle embodying a chain and sprocket wheels in the driving mechanism, although the invention is not limited to a bicycle or to any special form of main driving means.

The letter $a$ denotes an axle which extends within and through the hub $b$ of a driving wheel and at its opposite ends is secured in any convenient manner to the frame members $c$ and $d$ on opposite sides of the said wheel hub, this hub being here shown as that of the usual rear traction wheel of a bicycle. The nuts $c^1$, $d^1$ on the threaded ends of the axle form the specific fastening means to hold the axle against lengthwise movement.

Near the opposite ends of the exle $a$ are secured cones $e$, $f$ and on the balls $e^1$, $f^1$, which are arranged in that part of the ball race formed by these cones, is supported a rotatable driving member shown as a sleeve $g$. This sleeve is made in two sections for convenience of construction the ends of the sleeve being larger in diameter than the central portion. On the hub $g^1$ at one end of the sleeve a driver or sprocket gear wheel $h$ is secured as by screwing it onto the threaded surface of the hub and following it up with a lock nut $h^1$. Within this hub $g^1$ is located a ball case $g^2$ held in place in any convenient manner and coöperating with the cone $f$ to provide a ball race for the balls $f^1$. At the back of the hub $g^1$ on the rotary member $g$ a shoulder is formed against which a cone $g^3$ is supported on the sleeve, and this cone coöperates with a case $b^1$ secured in the end of the driving wheel hub $b$, the usual ball bearings being located between these parts. On the opposite end of the sleeve $g$ from the hub $g^1$ a ball carrier $i$ removably secured. In the form shown lugs $i^1$ extending from the end of the tubular hub of the ball carrier are located in sockets cut into a flange on the surface of the sleeve and the opening in this hub is counterbored to form a shoulder $i^2$ against which the end of the reduced portion of the sleeve $g$ rests. A nut $k$, threaded on its outer surface and shouldered to encounter the flange within the ball carrier, extends within the reduced section of the sleeve $g$ and engages a thread. This attaching and fastening means holds the two sections of the driving sleeve firmly together so that a rotary movement imparted as through the medium of the gear wheel $h$ on one end of the sleeve causes a like rotary movement of the ball carrier. This ball carrier $i$ has on its inner surface a case $l$ which coöperates with the cone $e$ to support the balls $e^1$. By the construction described the driving sleeve or inner hub $g$ is provided with and supported by ball bearings near its opposite ends which enable it to turn freely on the axle $a$. Outside of the driving sleeve $g$ the hub $b$ of the driving wheel is supported with ball bearings between the parts.

In that end of the hub $b$ adjacent to the ball carrier $i$ a clutch drum $m$ is arranged. For convenience of construction a removable ring of metal having a cylindrical portion $m^1$ with a thread on its periphery and a tapered extension forming a ball case $m^2$ is employed. This ring is screwed into a socket in the enlarged end of the hub $b$, a shoulder on the cylindrical portion $m^1$ resting against a shoulder in the bottom of the threaded socket in the end of the hub.

The balls $m^3$ located between the case $m^2$ and a cone $i^3$, on the outer surface of the ball carrier $i$, in connection with the balls upon the case $b^1$ at the other end of the hub, enable the hub $b$ to turn freely on the driving sleeve $g$. Except when the driving sleeve $g$ and the hub $b$ are connected by positive means which prevent the rotation of one on the other the hub $b$ will turn freely on said sleeve, and except for positive connecting means between the sleeve $g$ and the axle $a$ or a part fixed to the axle or frame, the sleeve will turn freely on the axle.

A convenient means of arranging the ball bearings between the driving parts, the axle, the driving sleeve, and the hub has been described, but my improvement is not limited to the specific forms, as other constructions may be employed without avoiding the main feature of my improvement.

To the hub $b$, and preferably by screwing it upon the enlarged and threaded end of the hub, a brake drum $n$ is secured, this drum having a surface against which a clutch part is adapted to be forced and held. In the form shown the flange $n^1$ is arranged with a socket to receive a shoe $n^2$, and this shoe is arranged in a plane parallel to the axis of the hub.

A brake anchor, shown as a plate or disk $o$ having a central support upon the shaft or axle $a$, is located between the frame member $c$ and the end of the hub and is held against rotation as by means of an arm $o^1$ extending along a frame member and clamped thereto as by means of a band $o^2$ and the bolt and nuts $o^3$. It is, however, only essential that this brake anchoring device shall be held on some fixed part of the frame and against rotation or lateral movement and the precise form is not material. An expanding split brake ring $p$ is supported by the brake anchor $o$ preferably by the engagement of tapered parts, a shoulder formed on a circular flange $o^4$ on the face of the disk being undercut and on this the correspondingly shaped inner edge of the expanding ring $p$ is fitted. When the ring is in its normal closed position it fits closely upon the flange and is thus held against accidental removal, and the expansion of the ring in its operation is so slight as to still retain the ring in place on the flange. The ring is attached to the brake disk by springing it over the flange $o^4$ and then allowing it to grasp the flange in its recoil closing movement. One end $p^1$ of the expanding ring $p$ rest against a lug or shoulder $o^5$ formed on or secured to the brake disk $o$ in such manner as to hold the ring against a rotary sliding movement on its support. The other end $p^2$ of this ring rests against a brake lever $r$ which is pivoted to the brake disk and has its end $r^1$ projecting into the path of movement of a trip device which is supported by and moves with the ball carrier $i$.

The preferred form of trip device consists of a series of balls $s$ located in radial sockets $s^1$ formed in the periphery of the cylindrical portion of the ball carrier. This circular line of sockets in which these balls $s$ are located is inclosed for the greater part of the circumference of the ball carrier by a ring $p^3$, the ring, however, having an opening through it on the outer side through which a ball can slide out from the socket and into a pocket formed on the tilting ball lever, this pocket stopping the ball in position as illustrated in Fig. 4 of the drawings where it forms a wedge in such manner that the continued rotation of the ball carrier will rock or tilt the lever in such manner as to expand the split ring of the brake mechanism and cause it to grasp the brake drum, which is fast to the hub of the wheel, firmly enough to impede the further rotation of the hub and wheel. Within the edge of the clutch drum another line of balls $t$ is located in radial sockets in the periphery of the ball carrier, and on the inner surface of the clutch drum is formed a series of sockets deeper at one end than the other, the bottom of each socket being formed on a line tangential to the surface of the ball carrier. These sockets are so arranged that one or more of the balls $t$ will drop into them and be wedged into position as shown in Fig. 3 of the drawings, so as to cause the ball carrier to rotate the clutch drum with it when the ball carrier is moved in one direction of its rotary movement.

The parts just described for the driving clutch and the sockets are so arranged to have the clutch operate to engage the drum when the wheel is to be moved forward, but the balls offer no obstacle to the rotary movement of the parts on each other in the opposite direction.

The operation of the device is as follows: The parts being arranged in the relative position in Figs. 1 and 6 of the drawings, a forward rotary movement imparted to the driving sleeve causes the parts borne by the ball carrier to engage the clutch drum, and as the latter is secured to the hub of the wheel it causes the wheel to be driven forward also, and thus move the vehicle. When the driving sleeve $g$ is connected by suitable driving mechanism with the crank shaft having pedals the rider of the vehicle, as a bicycle, can at any time stop the forward rotary movement of the crank shaft and the momentum of the bicycle will enable it to continue its forward movement. By this pause in the forward driving movement of the crank shaft the driving sleeve $g$ is held against rotation and the clutch drum and parts connected to it allowed to rotate freely. The pocket and the opening in the guard ring on the brake disk are so arranged that the balls $s$ do not impede the rotary movement of the ball carrier when the wheel is being driven forward, but when it is desired to apply the brake a reverse rotary movement, as through the medium of the pedals and crank shaft and connected driving mechanism, causes the driving sleeve $g$ to turn in a direction that causes a ball $s$ to lodge between the edge of the socket $s^1$ and the upper end of the brake lever. A continued application of force in the same direction tilts the lever and puts on the brake. The brake lever is preferably connected to the brake disk by a short stud, the outer end of which projects through the wall of the disk and is provided with a threaded end on which a nut is screwed to hold the parts in place. On this outer end of the stud a short lever arm may be secured and a pull wire connected to this short lever at the one end and to the lever connected to the handle bar at the other end enables the brake to be applied by hand without back-pedaling.

By the use of the mechanism described a vehicle, as a bicycle, is under perfect control in its forward driving, in running free as for coasting, and its forward movement is under control by the application of a band brake which is operated by back pedaling or by direct pull on a sleeve as described.

It is obvious that other means than those herein shown and described for operating in opposite directions upon a brake ring to cause it to bind a rotating part may be employed and yet come within the scope of my invention, and I do not desire to limit myself to the precise means of accomplishing such result as herein shown, as any means of attaining this end will come within the scope of the invention.

From the foregoing description it is apparent that when the brake actuating member or ball carrier $i$ is rocked backwardly, the brake lever $r$, acting upon what may be termed the free end of the braking device or ring $p$, pushes this free end of the brake ring in the direction of forward rotation of the hub and thus expands the ring against the hub's inner braking surface. Thus, when the ring is being expanded any tendency of the rotating hub drum $n$ is to " pick up " the free end of the brake ring and carry it further into braking position rather than to merely " wipe down " such end. Furthermore, as indicated in Figs. 3 and 4, what may be termed the rear end of the brake ring loosely abuts against the lug $o^5$, so that it has movable connection therewith, whereby in the braking action even this rear end can move outwardly into braking contact with the brake drum, the brake ring thus making braking contact throughout its entire peripheral braking surface, from end to end of the brake ring.

It is also apparent that in my mechanism all parts necessary to supplement the usual and ordinary pedals and sprocket chain, or their substitutes, in order to permit the bicycle to be driven, to coast with the rider's feet at rest on the pedals, and to be braked by action of the pedals are compactly assembled at the hub of the wheel. And, such parts being carried by the hub and held together against accidental separation from each other, the whole mechanism for thus supplementing the ordinary pedals and chain can be handled and transported as a unitary device entirely apart from the bicycle itself and even apart from the body of the wheel intended to receive such unitary device. The hub and its carried parts being produced and shipped as a unitary device, it is only necessary for a recipient to fasten the hub to the spokes of a usual wheel, slip the axle into the usual forks of the customary frame, place the ordinary sprocket chain about the sprocket wheel $h$, and fasten the brake anchor $o$ to the appropriate frame part, all of which can be readily done with a bicycle frame of usual and ordinary construction. Furthermore, the parts are protected from dirt and injury.

I claim as my invention:

1. In a velocipede or the like, the combination with an axle, and a driving wheel having its hub about said axle, of a driving member rotatable about said axle and with respect to which said hub is independently rotatable, means whereby said hub is driven when said driving member is rotated in one direction but said hub can rotate independently of said driving member, and means actuated by said driving member whereby said hub is braked when said driving member is moved in the opposite direction; substantially as described.

2. In a velocipede or the like, the combination of a rotatably supported driving member, a driving traction-wheel with its hub having support upon said driving member and rotatable independently thereof, and means whereby said hub is driven when said driving member is rotated in one direction, but said hub can rotate independently of said driving member, and said hub is braked when said driving member is moved in the opposite direction; substantially as described.

3. In a velocipede or the like, the combination of a rotatably supported driving member, a driving traction-wheel with its hub having support upon said driving member and rotatable independently thereof, a braking device, means whereby said hub is driven when said driving member is rotated in one direction, but said hub can rotate independently of said driving member, and means actuated by said driving member whereby when said driving member is moved in the opposite direction said braking device serves to brake said hub; substantially as described.

4. In a velocipede or the like, the combination of a rotatably supported driving member, a driving traction-wheel with its hub having support upon said driving member and rotatable independently thereof, a braking device within said hub, means within said hub whereby said hub is driven when said driving member is rotated in one direction, but said hub can rotate independently of said driving member, and means within said hub and actuated by said driving member whereby when said driving member is moved in the opposite direction said braking device serves to brake said hub; substantially as described.

5. In a velocipede or the like, the combination of an axle, a driving sleeve rotatably mounted upon said axle, a wheel hub having support upon said sleeve to rotate independently thereof, and means whereby said hub is driven when said driving sleeve is rotated in one direction, but said hub can rotate independently of said sleeve, and said hub is braked when said sleeve is moved in the opposite direction; substantially as described.

6. In a velocipede or the like, the combination of a rotatably supported driving sleeve, a driving traction-wheel with its hub having support upon said driving sleeve and rotatable independently thereof, a braking device, a clutch element carried by said sleeve for connecting said sleeve to said hub to drive said hub when said sleeve is rotated in one direction but enabling said hub to rotate independently of said sleeve, and operative connection also carried by said sleeve to effect braking of said hub by said braking device when said sleeve is moved in the opposite direction; substantially as described.

7. In a velocipede or the like, the combination of an axle, a driving sleeve rotatably mounted upon said axle, a wheel hub having support upon said sleeve to rotate independently thereof, a braking device, an anchor for said braking device, said anchor being supported upon said axle and anchored to a relatively stationary structural element of the velocipede, a clutch element carried by said sleeve for connecting said sleeve to said hub to drive said hub when said sleeve is rotated in one direction but enabling said hub to rotate independently of said sleeve, and operative connection also carried by said sleeve to effect braking of said hub by said braking device when said sleeve is moved in the opposite direction; substantially as described.

8. A driving, braking and coasting mechanism for velocipedes and the like, comprising a wheel hub, a rotatable driving member with respect to which said hub is rotatable, means whereby said hub is driven when said driving member is rotated in one direction, but said hub can rotate independently of said driving member, means whereby braking of said hub is effected when said driving member is moved in the opposite direction, and means whereby all of said elements are at all times held against accidental separation with respect to each other; substantially as described.

9. In a velocipede or the like, the combination with a frame, an axle supported therein, a driving wheel having its hub about said axle, and a braking device, of a driving sleeve between said axle and said hub, said sleeve being rotatable about said axle and said hub being rotatable about said sleeve, means whereby said hub is driven when said sleeve is rotated in one direction but said hub can rotate independently of said sleeve, and means whereby when said sleeve is moved in the opposite direction said braking device serves to brake said hub; substantially as described.

10. In a velocipede or the like, the combination with a frame, an axle supported therein, a driving wheel having its hub about said axle, and a braking device, of a driving sleeve rotatably mounted upon said axle, said sleeve being between said axle and said hub and furnishing a bearing for said hub, and said hub being rotatable about said sleeve, means whereby said hub is driven when said sleeve is rotated in one direction but said hub can rotate independently of said sleeve, and means whereby when said sleeve is moved in the opposite direction said braking device serves to brake said hub; substantially as described.

11. In a velocipede or the like, the combination with a frame, an axle supported therein, a driving wheel having its hub about said axle, and a braking device, of a driving sleeve between said axle and said hub and rotatable about said axle, said sleeve having a bearing cone thereon, a bearing for the hub between said cone and said hub, said hub being rotatable about said sleeve and on said bearing, means whereby said hub is driven when said sleeve is rotated in one direction but said hub can rotate independently of said sleeve, and means whereby when said sleeve is moved in the opposite direction said braking device serves to brake said hub; substantially as described.

12. In a velocipede or the like, the combination with a frame, an axle supported therein, a driving wheel having its hub about said axle, and a braking device, of a driving sleeve between said axle and said hub, said sleeve being rotatable about said axle and said hub being rotatable about said sleeve, one-way clutch mechanism between said sleeve and said hub, whereby when said sleeve is rotated in one direction said hub is driven but said hub can rotate independently of said sleeve, and means whereby when said sleeve is moved in the opposite direction said braking device serves to brake said hub; substantially as described.

13. A driving, braking and coasting mechanism for velocipedes and the like, comprising a wheel hub, a braking device, a brake-support holding said braking device and accessible from the exterior of said hub, a driving member, means whereby said hub is driven when said driving member is rotated in one direction but said hub can rotate independently of said driving member, and means whereby when said driving member is moved in the opposite direction said braking device serves to brake said hub, all of said elements being carried with said hub and held against accidental separation therefrom; substantially as described.

14. A driving, braking and coasting mechanism for velocipedes and the like, comprising an axle, a wheel hub about the same, a braking device, a brake-support holding said braking device and accessible from the exterior of said hub, a driving member rotatable about said axle, means whereby said hub is driven when said driving member is rotated in one direction but said hub can rotate independently of said driving member, and means whereby when said driving member is moved in the opposite direction said braking device serves to brake said hub, all of said elements being carried together and held against accidental separation; substantially as described.

15. A driving, braking and coasting mechanism for velocipedes and the like, comprising an axle, a driving member rotatable thereon, means for securing said driving member against accidental separation from said axle, a brake-support upon said axle, means for securing said brake-support against accidental separation from said axle, a braking device held by said brake-support, a rotatable wheel hub having support upon said driving member and held against accidental separation with respect thereto, said hub extending substantially from said driving member to said brake-support, means within said hub and whereby said hub is driven when said driving member is rotated in one direction but said hub can rotate independently of said driving member, and means also within said hub whereby when said driving member is moved in the opposite direction said braking device serves to break said hub; substantially as described.

16. In a driving, braking and coasting mechanism, a hub, a rotatable sleeve within said hub and with respect to which said hub is independently rotatable, a braking device coöperating with said hub, a driving clutch between said sleeve and said hub, and a brake clutch between said sleeve and said braking device and at the side of said driving clutch with respect to the longitudinal axis of said sleeve; substantially as described.

17. In a driving, braking and coasting mechanism, a hub, a rotatable sleeve within said hub and with respect to which said hub is independently rotatable, a driving clutch between said sleeve and said hub and of a character to permit said hub to rotate independently of said sleeve, a split brake-ring coöperating with said hub, a brake lever coöperating with said brake-ring, and a brake clutch between said sleeve and said brake lever; substantially as described.

18. In a driving and brake mechanism for vehicles, a brake including a rotary member and a stationary member, a split ring fast to the stationary member, a stop on a fixed member and engaging one end of the split ring, a brake lever adapted to engage the opposite end of the split ring, a ball carrier, pawls carried thereby and adapted to engage the brake lever, a drive clutch in operative relation to the carrier, and means for operating the carrier whereby the vehicle is driven forward in one direction of rotation of the carrier and the brake ring operated in a reverse direction of rotation thereof; substantially as described 19. In a drive and brake mechanism, in combination, a rotary member having a brake surface, a driving member, a drive clutch connecting said members in one direction of rotary movement, means for rotating the driving member, a non-rotary split ring held on a fixed part having a stop in engagement with one end of the ring, a movable part located on the driving member and means adapted to connect the driving member and the free end of the split ring in a reverse movement of the driving member whereby the split ring grasps the brake surface on the rotary member; substantially as described.

20. In a driving and brake mechanism, in combination, a rotary member, a driving member, a drive clutch connecting said members in one direction of rotary movement, means for operating the driving member, a disk fixed to the frame of the vehicle and having an annular flange with an undercut edge, a split ring with an undercut surface fitting that on the said flange, a fixed stop in engagement with one end of said split ring, a brake lever on said disk and engaging the free end of the split ring, a brake surface on the rotary member adjacent to the surface of the split ring, and a movable part on the driving member adapted to engage the brake lever in a reverse movement of the driving member; substantially as described.

21. In a brake mechanism, in combination, a rotary member having a brake surface, means for driving said member, a non-rotary split ring held on a fixed part having a stop in engagement with one end of the ring, a brake-actuating member within said rotary member, a movable part located on the brake-actuating member, and means adapted to connect the brake-actuating member and the free end of the split ring in a reverse movement of the brake-actuating member whereby the split ring grasps the brake surface of the rotary member; substantially as described.

22. In a driving and brake mechanism, in combination, a rotary member having a brake surface, a driving member, a drive clutch connecting said members in one direction of rotary movement, means for operating the driving member, a disk fixed to the frame of the vehicle and having an annular flange, a split ring supported on said flange, a fixed stop in engagement with one end of said ring, and means including a movable part located on the driving member for connecting the driving member and the free end of the split ring in a reverse movement of the driving member and whereby the split ring is forced against the brake surface on the rotary member; substantially as described.

23. In a device of the character described, the combination with inner and outer continuous sleeves, of means for driving the inner sleeve, independent ball bearings for each end of each sleeve, and a clutch between the two sleeves; substantially as described.

24. In a bicycle hub the combination with a driving sleeve and a driven sleeve both extending practically from one end to the other of the hub, of a clutch which connects the driven sleeve with the driving sleeve when the latter is moved forward and disconnects said sleeves when the driving sleeve is held stationary or moved backward; substantially as described.

25. In a cycle, the combination with the rear shaft, of a wheel having its hub comprising two independent continuous sleeves extending from end to end of said hub, the outer sleeve having flanges for the spokes and the inner sleeve having means at one end whereby it may be rotated, and a clutch intermediate said sleeves; substantially as described.

26. In a cycle, the combination with the rear axle, of an inner sleeve adapted to rotate thereon and to which power is applied, an outer sleeve having spoke flanges, both of said sleeves being continuous from end to end of the hub, independent bearings for said sleeves, and a clutch intermediate said sleeves; substantially as described.

27. A coasting and braking hub consisting, essentially, of an inner hub or gear sleeve rotatably mounted on the supporting shaft, an outer or wheel hub supported rotatably on said gear sleeve, an independent coasting clutch arranged to automatically clutch together and to release said gear sleeve and outer hub, a brake mechanism, an independent braking clutch element mounted upon said inner sleeve and engaging said brake mechanism, the backward movement of said gear sleeve locking together the members of said braking clutch and applying the brake and the forward movement of said sleeve releasing said clutch and brake, said coasting and braking clutches being wholly disconnected from each other and operating in parallel planes; substantially as described.

28. A coasting hub consisting, essentially, of the supporting shaft, an inner hub or gear sleeve mounted on said supporting shaft and rotating independently thereon, an outer or wheel hub wholly supported rotatably on said gear sleeve, and means for automatically clutching together and unclutching said gear sleeve and outer hub; substantially as described.

29. A coasting and braking hub consisting, essentially, of a supporting shaft, an inner sprocket or gear sleeve mounted rotatably and independently thereon, an outer or wheel hub wholly supported rotatably on said gear sleeve, means for automatically clutching together and unclutching said gear sleeve and outer hub, the driving sprocket or gear secured to one end of said gear sleeve, a brake arranged at the opposite end of said hub, and means for operating said brake by the backward movement of said gear sleeve; substantially as described.

30. The combination with a wheel hub, of a brake mechanism located at one end of the hub and a driver located at the opposite end of the hub, a sleeve connected with the driver and projected within the hub and clutch devices for connecting the driver and sleeve with the hub for driving the wheel or with the brake mechanism to apply the brake; substantially as described.

31. In a bicycle the combination with a supporting axle and a wheel hub, of a driver provided with a connected sleeve mounted upon the axle and projected within the hub, a brake mechanism comprising a brake actuator and clutch devices for connecting the driver sleeve with the hub or the brake actuator; substantially as described.

32. In a bicycle, the combination with a supporting axle and a wheel hub, of a driver located at one end of the hub and a brake mechanism located at the opposite end of the hub, a sleeve connected to the driver and projected laterally within the hub, and a clutch connection between the said sleeve and the brake mechanism; substantially as described.

33. In a bicycle, the combination with a wheel hub, of a split brake ring mounted upon a fixed support at one end of the hub, a brake drum carried by the hub, a driver mounted at the opposite end of the hub, suitable pedals and connections for actuating the driver, and a detachable rotative connecting device controlled by the pedals through the driver for connecting said driver with the hub or brake, or for disconnecting it from both; substantially as described.

34. A coasting hub consisting, essentially, of a supporting shaft, a driving or gear sleeve rotatably supported, at a plurality of points thereon, an outer or wheel hub rotatably mounted on said gear sleeve and provided with a brake drum, means coöperating with said brake drum to apply a brake thereto, and means for automatically clutching together said gear sleeve and outer hub for driving the wheel and unclutching the same for coasting; substantially as described.

35. A coasting hub consisting, essentially, of a supporting shaft, a driving or gear sleeve rotatably supported at a plurality of points thereon, an outer or wheel hub rotatably supported on said gear sleeve and provided at one end with a brake drum, means coöperating with said brake drum to control the speed of the wheel, and means for automatically clutching together said gear sleeve and outer hub for driving the wheel and unclutching the same for coasting; substantially as described.

36. A coasting hub consisting, essentially, of a supporting shaft, a driving or gear sleeve rotatably supported at a plurality of locations thereon and provided at one end with a driver, an outer or wheel hub rotatably mounted on said gear sleeve, and provided with a brake drum located at the opposite end of the hub from the driver, means for applying a brake to said drum, and means for automatically clutching together and unclutching said gear sleeve and outer hub; substantially as described.

37. A coasting hub consisting, essentially, of a supporting shaft, a driving gear sleeve rotatably mounted thereon and provided at one end with a driver, an outer or wheel hub rotatably mounted on said gear sleeve and provided with a brake drum located at the opposite end of the hub from the driver, a clutch pawl located outside of said gear sleeve and in suitable relation to said brake drum to coöperate therewith in braking, and means for automatically clutching together and unclutching said gear sleeve and outer hub; substantially as described.

38. A coasting hub consisting, essentially, of a supporting shaft, a driving or gear sleeve rotatably mounted thereon and provided at one end with a driver, an outer or wheel hub bearing rotatably on said gear sleeve and provided with a brake drum located at the opposite end of the hub from the driver, a clutch pawl located outside of said gear sleeve and within the lines of said brake drum and in suitable relation thereto to coöperate therewith in braking, and means for automatically clutching together and unclutching said gear sleeve and outer hub; substantially as described.

39. A coasting hub consisting, essentially, of a supporting shaft, a driving or gear sleeve rotatably mounted thereon and provided at one end with a driver, an outer or wheel hub wholly supported rotatably on said gear sleeve and provided with a brake drum located at the opposite end of the hub from the driver, means for applying a brake to said drum and means for automatically clutching together and unclutching said gear sleeve and outer hub; substantially as described.

40. A coasting hub consisting, essentially, of a supporting shaft, a driving or gear sleeve rotatably mounted thereon and provided at one end with a driver, an outer or wheel hub wholly supported rotatably on said gear sleeve and provided with a brake drum located at the opposite end of the hub from the driver, a clutch pawl located outside of said gear sleeve and in suitable relation to said brake drum to coöperate therewith in braking, and means for automatically clutching together and unclutching said gear sleeve and outer hub; substantially as described.

41. A coasting and braking hub consisting, essentially, of a supporting shaft, a driving or gear sleeve mounted rotatably thereon, an outer or wheel hub wholly supported rotatably on said gear sleeve, and means for automatically clutching together and unclutching said gear sleeve and outer hub, a driving sprocket or gear secured to one end of said gear sleeve, a brake arranged at the opposite end of said hub, and means for operating said brake by the backward rotation of the crank shaft; substantially as described.

42. A coasting and braking hub consisting, essentially, of a supporting shaft, a driving gear sleeve supported rotatably at a plurality of locations thereon, an outer or wheel hub supported rotatably on said gear sleeve, and means for automatically clutching together and unclutching said gear sleeve and outer hub, a driving sprocket or gear secured to one end of said gear sleeve, a brake arranged at the opposite end of said hub, and means for operating said brake by a backward rotation of the crank shaft; substantially as described.

43. In a bicycle hub the combination with a driving sleeve and a driven sleeve provided with a braking drum, both sleeves extending practically from one end to the other of the hub, of means for applying a brake to said drum and a clutch which connects the driven sleeve with the driving sleeve when the latter is moved forward and disconnects said sleeves when the driving sleeve is held stationary or moved backward; substantially as described.

44. In a device of the character described, the combination with inner and outer continuous sleeves, the latter provided with a braking drum, of means for driving the inner sleeve, independent ball bearings for each end of said sleeve, a clutch between the two sleeves, and means for applying a brake to said braking drum; substantially as described.

45. In a cycle, the combination with the rear shaft, of a wheel having its hub comprising two independent continuous sleeves extending from end to end of said hub, the outer sleeve being provided with a braking drum and having connections for the spokes and the inner sleeve having means at one end whereby it may be rotated, a clutch intermediate said sleeves, and means for applying a brake to said braking drum; substantially as described.

46. In a cycle, the combination with the rear axle, of an inner sleeve adapted to rotate thereon and to which power is applied, an outer sleeve provided with a braking drum and having spoke connections both of said sleeves being continuous from end to end of the hub, independent bearings for said sleeves, a clutch intermediate said sleeves, and means for applying a brake to said braking drum; substantially as described.

47. The combination with a wheel hub, of a brake mechanism located at one end of the hub and a driver located at the opposite end of said hub, a sleeve connected with the driver and projected within the hub and arranged to bear at more than one point on the supporting shaft, and clutch devices for connecting the driver and sleeve with the hub for driving the wheel, or with the brake mechanism to apply the brake; substantially as described.

48. In a bicycle, the combination with a supporting axle and a wheel hub, of a driver provided with a connected sleeve mounted upon the axle and projected within the hub, said sleeve being supported at a plurality of locations on said supporting axle, a brake mechanism comprising a brake actuator, and clutch devices for connecting the driver sleeve with the hub or the brake actuator; substantially as described.

49. In a bicycle, the combination with a supporting axle and a wheel hub, of a driver located at one end of the hub and a brake mechanism located at the opposite end of the hub, a sleeve connected to the driver and projected laterally within the hub, said sleeve bearing at a plurality of points on said supporting axle, and a clutch connection between the said sleeve and the brake mechanism; substantially as described.

50. In a coasting brake mechanism, the combination with a wheel hub provided with an inner braking surface, of driving means, an extensible braking element, means for retaining the same in non-rotatable position, one end of said extensible braking element having a movable connection with said retaining means, means for exerting pressure against the opposite end of said extensible braking element to force the same frictionally against said braking surface of the hub on reversing said driving means, and means for causing the direction of said pressure to coincide with the direction of forward rotation of the wheel; substantially as described.

51. In a hub brake mechanism, a wheel hub provided with an inner braking surface, a non-rotatable anchoring plate supported at one point by the axle and engaging the frame of the vehicle at a distance therefrom, a non-rotatable, expansible split ring brake member having one end movably engaging said anchoring plate, driving means, means operated by said driving means for forcing the entire braking surface of said brake ring member into braking contact with said braking surface of the hub by pressure exerted upon the opposite end of said split ring, said pressure being exerted upon said brake ring in the direction of forward rotation of said braking surface of the hub; substantially as described.

52. The combination of a stationary supporting shaft, a revoluble hub provided with an inner braking surface and driving means, braking means supported by said shaft, means for connecting said driving means and said hub for forward driving and disconnecting the same for coasting, a driving or crank shaft and means for producing contact between said braking means and said braking surface of the hub for braking the latter upon the reverse movement of said driving or crank shaft, said braking means embodying a non-rotatable braking element having its entire braking surface movable against said braking surface of the hub and held in position by a stationary fixture supported at one point by said supporting shaft and having an extension engaging the vehicle frame at a distance from said supporting shaft; substantially as described.

53. The combination of a stationary supporting shaft, a coasting wheel hub revolubly supported thereon and provided with an inner peripheral braking surface, a braking device embodying a radially extensible braking element applicable thereto and means for keeping said braking element in non-rotatable position, driving means, and means for moving the entire peripheral braking surface of said extensible braking element outwardly into braking contact with said braking surface of the hub on the reverse movement of said driving means; substantially as described.

54. The combination with a coasting wheel hub provided with an inner braking surface, of a brake mechanism comprising a stationary fixture, a slightly movable braking element connected non-rotatably thereto, driving means, and means actuated by the reverse movement of said driving means for forcing the entire peripheral braking surface of said movable braking element outwardly in a radial direction against said braking surface of the hub, said stationary fixture being arranged to be supported by the axle at one point and having an extension for engaging the vehicle frame at a distance from said axle; substantially as described.

55. In a hub brake mechanism, a wheel hub provided with an inner braking surface, a stationary fixture supported at one point by the axle and engaging the frame of the vehicle at a distance therefrom, a split ring brake member secured in non-rotatable position by said fixture, driving means, and means operated by reversing said driving means for forcing the entire braking surface of said split ring brake member outwardly against said braking surface of the hub; substantially as described.

JAMES S. COPELAND.

Witnesses:
ARTHUR B. JENKINS,
H. E. HART.

---

Copies of this patent may be obtained for five cents each, by addressing the "Commissioner of Patents, Washington, D. C."

---

Corrections in Letters Patent No. 1,069,603.

It is hereby certified that in Letters Patent No. 1,069,603, granted August 5, 1913, upon the application of James S. Copeland, of Hartford, Connecticut, for an improvement in "Driving and Braking Mechanisms for Vehicles," errors appear in the printed specification requiring correction as follows: Page 1, line 74, for the word "exle" read *axle;* same page, line 98, before the word "removably" insert the word *is;* page 2, line 89, for the word "rest" read *rests;* page 5, line 92, for the word "break" read *brake;* and that the said Letters Patent should be read with these corrections therein that the same may conform to the record of the case in the Patent Office.

Signed and sealed this 23rd day of September, A. D., 1913.

[SEAL.]

R. T. FRAZIER,

*Acting Commissioner of Patents.* ring, said pressure being exerted upon said brake ring in the direction of forward rotation of said braking surface of the hub; substantially as described.

52. The combination of a stationary supporting shaft, a revoluble hub provided with an inner braking surface and driving means, braking means supported by said shaft, means for connecting said driving means and said hub for forward driving and disconnecting the same for coasting, a driving or crank shaft and means for producing contact between said braking means and said braking surface of the hub for braking the latter upon the reverse movement of said driving or crank shaft, said braking means embodying a non-rotatable braking element having its entire braking surface movable against said braking surface of the hub and held in position by a stationary fixture supported at one point by said supporting shaft and having an extension engaging the vehicle frame at a distance from said supporting shaft; substantially as described.

53. The combination of a stationary supporting shaft, a coasting wheel hub revolubly supported thereon and provided with an inner peripheral braking surface, a braking device embodying a radially extensible braking element applicable thereto and means for keeping said braking element in non-rotatable position, driving means, and means for moving the entire peripheral braking surface of said extensible braking element outwardly into braking contact with said braking surface of the hub on the reverse movement of said driving means; substantially as described.

54. The combination with a coasting wheel hub provided with an inner braking surface, of a brake mechanism comprising a stationary fixture, a slightly movable braking element connected non-rotatably thereto, driving means, and means actuated by the reverse movement of said driving means for forcing the entire peripheral braking surface of said movable braking element outwardly in a radial direction against said braking surface of the hub, said stationary fixture being arranged to be supported by the axle at one point and having an extension for engaging the vehicle frame at a distance from said axle; substantially as described.

55. In a hub brake mechanism, a wheel hub provided with an inner braking surface, a stationary fixture supported at one point by the axle and engaging the frame of the vehicle at a distance therefrom, a split ring brake member secured in non-rotatable position by said fixture, driving means, and means operated by reversing said driving means for forcing the entire braking surface of said split ring brake member outwardly against said braking surface of the hub; substantially as described.

JAMES S. COPELAND.

Witnesses:
ARTHUR B. JENKINS,
H. E. HART.

---

Copies of this patent may be obtained for five cents each, by addressing the "Commissioner of Patents, Washington, D. C."

---

Corrections in Letters Patent No. 1,069,603.

It is hereby certified that in Letters Patent No. 1,069,603, granted August 5, 1913, upon the application of James S. Copeland, of Hartford, Connecticut, for an improvement in "Driving and Braking Mechanisms for Vehicles," errors appear in the printed specification requiring correction as follows: Page 1, line 74, for the word "exle" read *axle;* same page, line 98, before the word "removably" insert the word *is;* page 2, line 89, for the word "rest" read *rests;* page 5, line 92, for the word "break" read *brake;* and that the said Letters Patent should be read with these corrections therein that the same may conform to the record of the case in the Patent Office.

Signed and sealed this 23rd day of September, A. D., 1913.

[SEAL.]

R. T. FRAZIER,

*Acting Commissioner of Patents.*

It is hereby certified that in Letters Patent No. 1,069,603, granted August 5, 1913, upon the application of James S. Copeland, of Hartford, Connecticut, for an improvement in "Driving and Braking Mechanisms for Vehicles," errors appear in the printed specification requiring correction as follows: Page 1, line 74, for the word "exle" read *axle;* same page, line 98, before the word "removably" insert the word *is;* page 2, line 89, for the word "rest" read *rests;* page 5, line 92, for the word "break" read *brake;* and that the said Letters Patent should be read with these corrections therein that the same may conform to the record of the case in the Patent Office.

Signed and sealed this 23rd day of September, A. D., 1913.

[SEAL.]

R. T. FRAZIER,

*Acting Commissioner of Patents.*